(12) United States Patent
Mishima et al.

(10) Patent No.: US 12,210,728 B2
(45) Date of Patent: Jan. 28, 2025

(54) INFORMATION COMMUNICATION APPARATUS AND PROGRAM FOR CONTROLLING INFORMATION COMMUNICATION APPARATUS

(71) Applicant: FUJIFILM CORPORATION, Tokyo (JP)

(72) Inventors: Yu Mishima, Kanagawa (JP); Yoshihiro Sekine, Kanagawa (JP); Yuki Shimizu, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/844,778

(22) Filed: Jun. 21, 2022

(65) Prior Publication Data

US 2022/0321716 A1 Oct. 6, 2022

Related U.S. Application Data

(63) Continuation of application No. PCT/JP2020/049163, filed on Dec. 28, 2020.

(30) Foreign Application Priority Data

Dec. 26, 2019 (JP) ................. 2019-236893

(51) Int. Cl.
*G06F 17/00* (2019.01)
*G06F 3/0482* (2013.01)
(Continued)

(52) U.S. Cl.
CPC ....... *G06F 3/0482* (2013.01); *H04N 1/00424* (2013.01); *H04N 1/00427* (2013.01); *H04N 1/32096* (2013.01)

(58) Field of Classification Search
CPC . G06F 3/0482; H04N 1/0035; H04N 1/00411
(Continued)

(56) References Cited

U.S. PATENT DOCUMENTS 8,799,815 B2 * 8/2014 Hoellwarth ........... G06F 3/0482
715/811
10,860,172 B2 * 12/2020 Kamasuka ......... H04N 1/00506
(Continued)

FOREIGN PATENT DOCUMENTS

CN 105897991 A 8/2016
JP 2009-181464 A 8/2009
(Continued)

OTHER PUBLICATIONS

Biagio, Office365 Email User Photo—Wrong Initials, Microsoft Community, published Jul. 2015 (Year: 2015).*
(Continued)

*Primary Examiner* — Adam M Queler
*Assistant Examiner* — Matthew J Ludwig
(74) *Attorney, Agent, or Firm* — SOLARIS Intellectual Property Group, PLLC

(57) ABSTRACT

An information communication apparatus includes a processor and a memory coupled to or integrated with the processor and is configured to designate a communication destination by selecting a desired recipient from plural recipients displayed in a list form in an operation screen, in which the processor displays, for the recipients, recipient names, which are names of the recipients, displays, in front of each of the recipient names, a letter icon including a combination of an initial letter of each recipient name in a case in which the recipient names are written with phonetic characters, and a figure, sorts the recipients in a predeter-
(Continued)

mined display order based on the initial letter included in the letter icon, and displays the sorted recipients in the operation screen.

4 Claims, 9 Drawing Sheets

(51) Int. Cl.
*H04N 1/00* (2006.01)
*H04N 1/32* (2006.01)

(58) Field of Classification Search
USPC .......................................................... 715/739
See application file for complete search history.

(56) References Cited

U.S. PATENT DOCUMENTS

| | | | |
|---|---|---|---|
| 11,347,945 B2* | 5/2022 | Sato | G06F 3/0482 |
| 2003/0058478 A1* | 3/2003 | Aoki | H04M 1/2747 |
| | | | 358/402 |
| 2008/0168349 A1* | 7/2008 | Lamiraux | G06F 3/04883 |
| | | | 715/702 |
| 2008/0261569 A1* | 10/2008 | Britt | G06Q 10/107 |
| | | | 455/566 |
| 2013/0246973 A1* | 9/2013 | Tomiyasu | H04N 1/00482 |
| | | | 715/830 |
| 2013/0283195 A1* | 10/2013 | Bilgen | G06F 3/0485 |
| | | | 715/767 |
| 2016/0070412 A1 | 3/2016 | Shimazu et al. | |
| 2016/0239165 A1 | 8/2016 | Chen et al. | |
| 2016/0259489 A1 | 9/2016 | Yang | |
| 2017/0237723 A1* | 8/2017 | Gupta | H04L 67/02 |
| | | | 726/7 |
| 2019/0279127 A1* | 9/2019 | Togo | G06F 3/048 |
| 2020/0213457 A1* | 7/2020 | Takahashi | H04N 1/00384 |

FOREIGN PATENT DOCUMENTS

| | | |
|---|---|---|
| JP | 2013-191178 A | 9/2013 |
| JP | 2014-106560 A | 6/2014 |
| JP | 2014-228989 A | 12/2014 |
| JP | 2018-508133 A | 3/2018 |
| JP | 2018-511865 A | 4/2018 |

OTHER PUBLICATIONS

English language translation of the following: Office action dated Jul. 2, 2024 from the JPO in a Japanese patent application No. 2023-088826 corresponding to the instant patent application. This office action translation is submitted now in order to supplement the understanding of the cited references which are being disclosed in the instant Information Disclosure Statement.

* cited by examiner

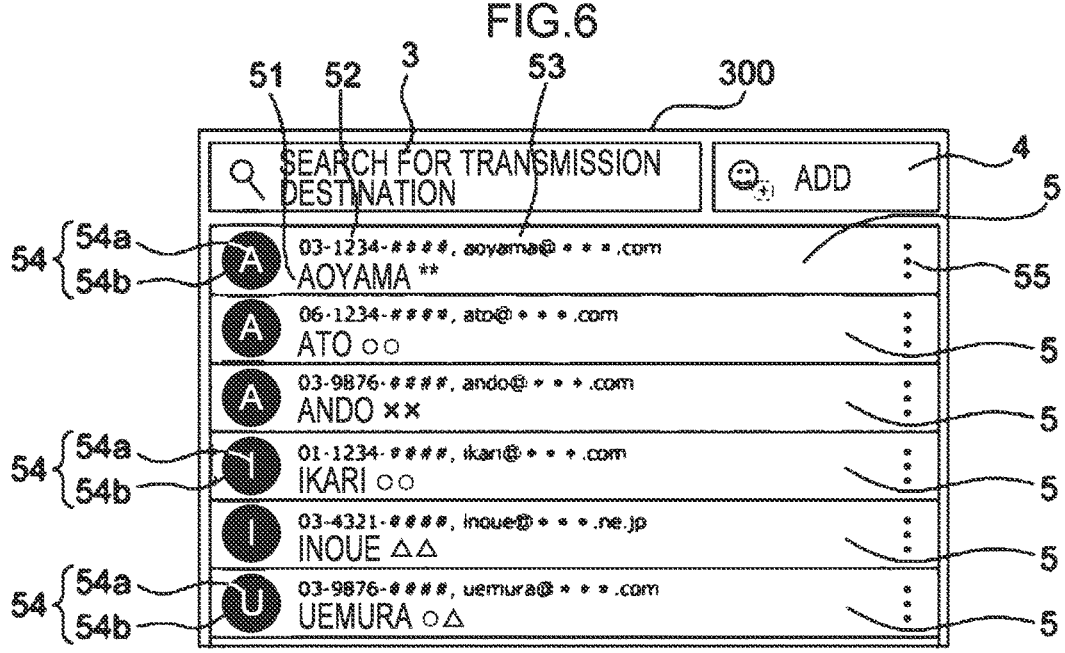

INFORMATION COMMUNICATION APPARATUS AND PROGRAM FOR CONTROLLING INFORMATION COMMUNICATION APPARATUS

CROSS-REFERENCE TO RELATED APPLICATIONS

This application is a continuation application of International Application No. PCT/JP2020/049163, filed on Dec. 28, 2020, the disclosure of which is incorporated herein by reference in its entirety. Further, this application claims priority from Japanese Patent Application No. 2019-236893, filed on Dec. 26, 2019, the disclosure of which is incorporated herein by reference in its entirety.

FIELD

The technology of the present disclosure relates to an information communication apparatus and a recording medium storing a control program for the information communication apparatus.

Conventionally, in a communication apparatus having a function of transmitting a voice or an image to a desired recipient by communication or an information communication apparatus such as a multi-function peripheral, an address book including information such as a recipient name, a telephone number, a FAX number, and an e-mail address can be registered in advance by being stored in an address book storage unit in the apparatus. The communication destination is generally designated by loading a stored address book from the address book storage unit, displaying the address book in a list form in an operation screen, and selecting a desired recipient from the displayed address book.

The address book displayed in the operation screen is usually displayed in a state of being sorted in the Japanese syllabary order or the alphabetical order of names of individual recipients (recipient names). At this time, in order to make it easy to search for a desired recipient from a large number of recipients, recipients may be grouped for each of rows of a Japanese syllabary such as "A, KA, SA, . . . , and WA", for each Japanese syllable (gojuon) such as "A, I, U, E, O, . . . , and N", or for each alphabet letter such as "A, B, C, . . . , and Z" based on a name of a recipient (recipient name). An index row indicating in what unit each group is formed may be displayed above each group.

For example, Japanese Patent Application Laid-Open (JP-A) No. 2013-191178 discloses an information apparatus in which, in response to a scrolling operation, some of icons corresponding to groups in an address list classified into a plurality of groups are popped up while being arranged in a line in a scroll direction on one side of an operation screen so that a user can easily understand which portion of the entire address list corresponds to a recipient displayed in the operation screen at the time of performing the scrolling operation on the address list. An icon corresponding to a group to which a recipient at the head of the address list displayed in the operation screen belongs is independently popped up on the side of the icon group. With the information apparatus, it is possible to easily understand a position of a portion currently displayed in an operation screen in an entire address list based on a positional relationship between popped-up icons.

SUMMARY

However, in the information apparatus described in JP-A No. 2013-191178, it is necessary to perform complicated control such that a plurality of icons respectively corresponding to a plurality of groups including a group corresponding to a recipient displayed in an operation screen are popped up while being arranged in one direction in an arrangement order of the groups in response to a scroll operation, and an icon corresponding to a group to which a recipient at the head of an address list displayed in the operation screen belongs is independently popped up. Since each icon is popped up separately from the address list, there is a problem that it is difficult to understand a relevance between each recipient in the address list displayed in the operation screen and each icon that is popped up.

An object of the technology of the disclosure is to obtain an information communication apparatus in which an address book excellent in performance in searching for individual recipients is displayed in an operation screen, and a recording medium storing a control program for the information communication apparatus.

An information communication apparatus according to a first aspect is an information communication apparatus that includes a processor and a memory coupled to or integrated with the processor and is configured to designate a communication destination by selecting a desired recipient from a plurality of recipients displayed in a list form in an operation screen, in which the processor displays, for the recipients, recipient names, which are names of the recipients and displays, in front of each of the recipient names, a letter icon including a combination of an initial letter of each recipient name in a case in which the recipient names are written with phonetic characters, and a figure, and sorts the recipients in a predetermined display order based on the initial letter included in the letter icon and displays the sorted recipients in the operation screen.

In the information communication apparatus, in a case in which the recipient names written with kanji letters are displayed for the recipients, the initial letter of each recipient name may be an initial letter of phonetic letters (kana) of the kanji letters constituting the recipient name, the letter icon may include a combination of the initial letter of the phonetic letters and the figure, and the recipients may be sorted in the Japanese syllabary order based on the initial letter in the operation screen.

In the information communication apparatus, in a case in which the recipient names written with alphabet letters which are phonetic are displayed for the recipients, the initial letter of each recipient name may be an initial letter of the alphabet letters constituting the recipient name, the letter icon may include a combination of the initial letter of the alphabet letters and the figure, and the recipients may be sorted in the alphabetical order based on the initial letter in the operation screen.

In the information communication apparatus, the figure included in the letter icon may have a different form for each Japanese syllable as the initial letter.

In the information communication apparatus, the figure included in the letter icon may have a different form for each alphabet letter as the initial letter.

A control program for an information communication apparatus according to a second aspect is a control program that causes a computer to function as the information communication apparatus, which is configured to designate a communication destination by selecting a desired recipient from a plurality of recipients displayed in a list form in an operation screen, the control program causing the computer to execute: processing of displaying, for the recipients, recipient names which are names of the recipients and displaying, in front of each of the recipient names, a letter icon including a combination of an initial letter of each recipient name in a case in which the recipient names are written with phonetic characters, and a figure; and processing of sorting the recipients in a predetermined display order based on the initial letter included in the letter icon and displaying the sorted recipients in the operation screen.

In the control program for the information communication apparatus, in a case in which the recipient names written with kanji letters are displayed for the recipients, the initial letter of each recipient name may be an initial letter of phonetic letters (kana) of the kanji letters constituting the recipient name, the letter icon may include a combination of the initial letter of the phonetic letters and the figure, and the recipients may be sorted in the Japanese syllabary order based on the initial letter in the operation screen.

In the control program for the information communication apparatus, in a case in which the recipient names written with alphabet letters, which are phonetic characters, are displayed for the recipients, the initial letter of each recipient name may be an initial letter of the alphabet letters constituting the recipient name, the letter icon may include a combination of the initial letter of the alphabet letters and the figure, and the recipients may be sorted in the alphabetical order based on the initial letter in the operation screen.

In the control program for the information communication apparatus, the figure included in the letter icon may have a different form for each Japanese syllable as the initial letter.

In the control program for the information communication apparatus, the figure included in the letter icon may have a different form for each alphabet letter as the initial letter.

Advantageous Effects of Invention

According to the technology of the disclosure, it is possible to display an address book excellent in performance in searching for individual recipients in an operation screen.

BRIEF DESCRIPTION OF DRAWINGS

FIG. 6 is a view illustrating a recipient selection screen in which a part of an address book is displayed in the multi-function peripheral according to the first embodiment.

FIG. 7 is a view illustrating a recipient information list stored in the control device of the multi-function peripheral according to the first embodiment.

FIG. 8 is a view illustrating letter icon setting information stored in the control device of the multi-function peripheral according to the first embodiment.

DESCRIPTION OF EMBODIMENTS

Hereinafter, embodiments of the present disclosure will be described with reference to the drawings.

First Embodiment (Multi-Function Peripheral 100)

Figure 1:
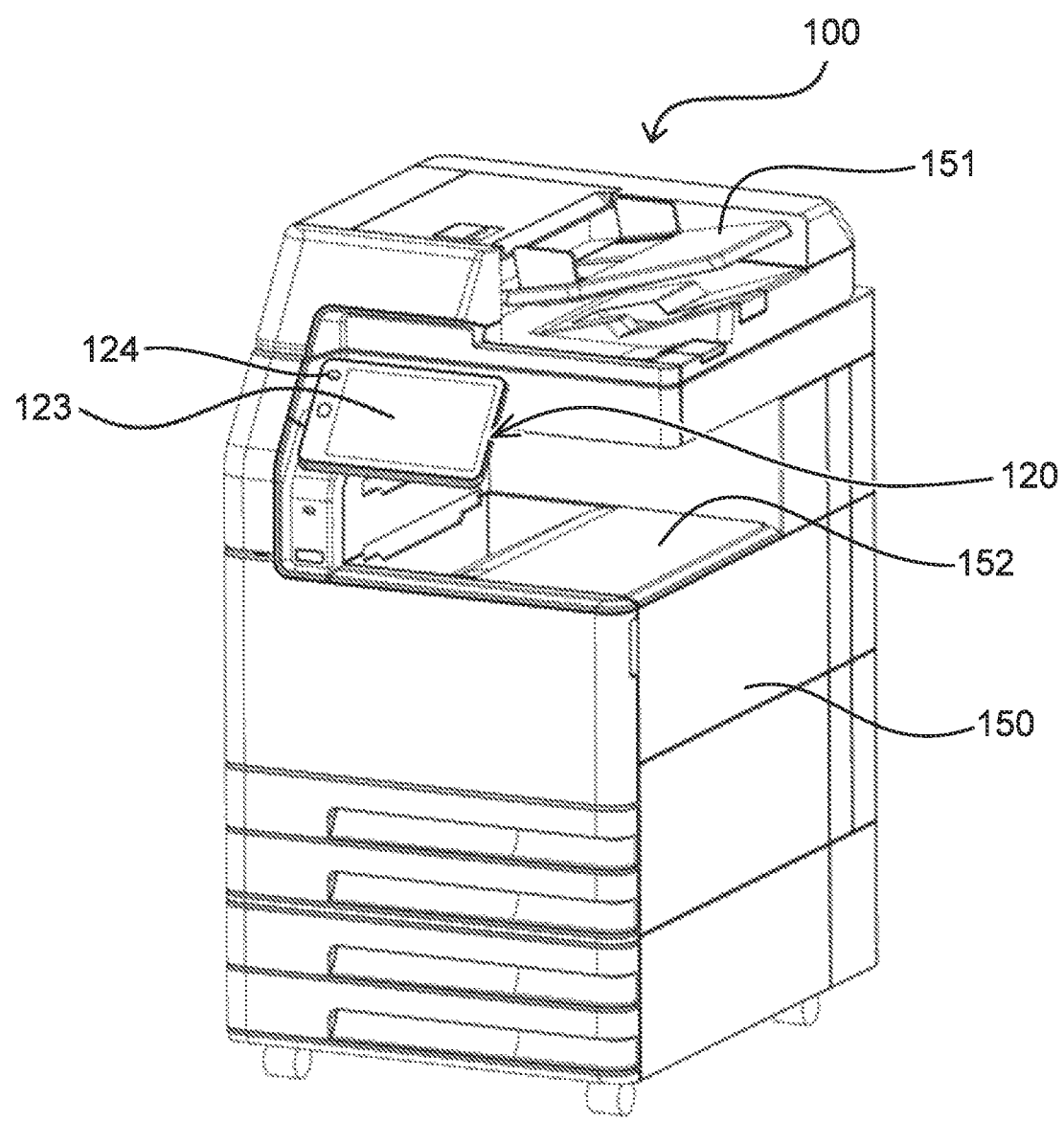
FIG. 1 is a view illustrating an appearance of a multi-function peripheral according to a first embodiment.
Figure 2:
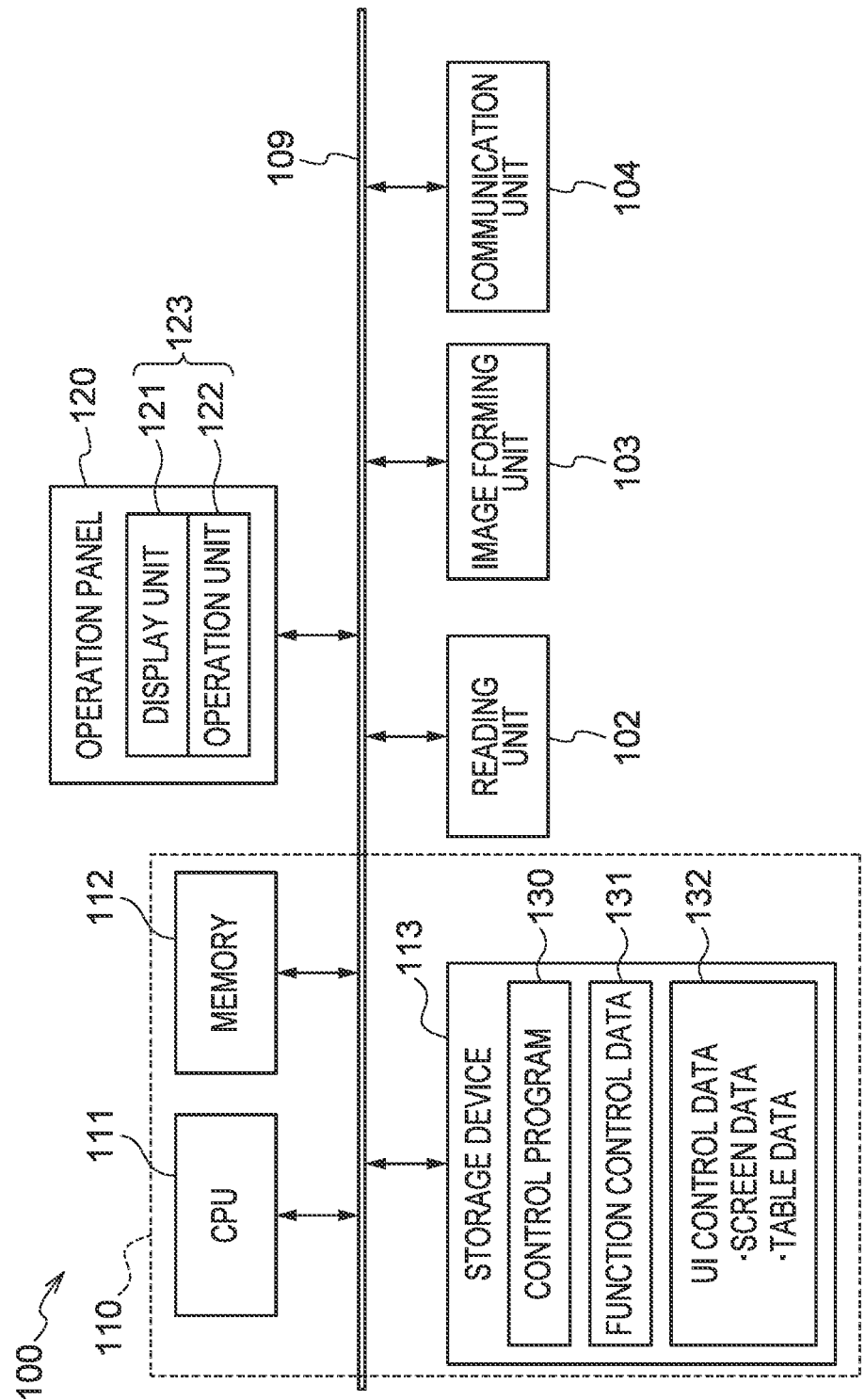
FIG. 2 is a block diagram illustrating a hardware configuration of a control device used in the multi-function peripheral according to the first embodiment.

An information apparatus of the disclosure will be described with a multi-function peripheral 100 as an example. FIG. 1 is a view illustrating an appearance of the multi-function peripheral 100 according to the present embodiment. FIG. 2 is a block diagram illustrating a hardware configuration of the multi-function peripheral 100.

The multi-function peripheral 100 illustrated in FIGS. 1 and 2 is a device capable of executing processing for functions such as copying, printing, image scanning, and facsimile (also referred to as FAX). As illustrated in FIG. 2, the multi-function peripheral 100 includes a control device 110, a reading unit 102, an image forming unit 103, and a communication unit 104 in a main body 150. The multi-function peripheral 100 can perform data communication with an information processing apparatus such as a personal computer or a server in an office connected to a local area network (LAN) line or the like, or perform facsimile communication with a communication apparatus in another office through a public line such as a telephone line. Therefore, the multi-function peripheral 100 is an example of the information communication apparatus. That is, the information communication apparatus has a function of transmitting a voice or an image by communication. The information apparatus of the disclosure includes, in addition to a telephone line apparatus such as a mobile phone and a facsimile, for example, an information apparatus in which functions of office equipment such as a copier, a printer, an image scanner, and a facsimile are housed in one housing, like the multi-function peripheral 100.

An operation panel 120, the control device 110 including a storage device 113, the reading unit 102, the image forming unit 103, and the communication unit 104 are mutually connected by a bus 109. Each unit of the multi-function peripheral 100 will be described below.

(Reading Unit 102, Image Forming Unit 103, and Communication Unit 104)

The reading unit 102 reads an image of a document. Specifically, the reading unit 102 generates image data by optically reading an image of a document and converting the image into a digital signal.

The image forming unit 103 forms an image on a medium such as a paper sheet. Specifically, the image forming unit 103 forms an image on a medium by, for example, an electrophotographic method in which an image is formed by electrostatically attaching a toner onto a paper sheet. Note that the image forming unit 103 may form an image on a medium by another method such as an inkjet method in which an image is formed by ejecting an ink onto a paper sheet.

The communication unit 104 communicates with an external device such as another facsimile device. Specifically, the communication unit 104 transmits and receives various pieces of data to and from an external device by communication using various wired or wireless communication lines. Examples of the communication line include the Internet, an intranet, and a public telephone line.

For example, the multi-function peripheral 100 includes a document feeding device 151 provided at an upper portion of the main body 150 as illustrated in FIG. 1. The document feeding device 151 feeds a document to a document reading stage (not illustrated) disposed on an upper surface of the main body 150. The reading unit 102 is disposed at a position facing the reading stage in the main body 150. The document feeding device 151 can be lifted up. As the document feeding device 151 is lifted up, the reading stage is exposed and can be used as a so-called flatbed type. Therefore, a user can directly set a document on the reading stage without using the document feeding device 151.

The multi-function peripheral 100 of this example has, as four main functions, a copy function of copying a document, a scanning function of reading a document, a facsimile function of transmitting an image obtained by reading a document as image data, and a printing function of printing an image on a paper sheet. In a case where processing related to the scanning function is executed in the multi-function peripheral 100, an image of a document is read by the reading unit 102, and image data is generated. In a case where processing related to the copy function is executed in the multi-function peripheral 100, the image forming unit 103 prints an image of a document on another paper sheet based on image data generated by the reading unit 102. The paper sheet on which an image is printed is discharged to a paper sheet discharging unit 152 provided in the main body 150. In a case where processing related to the facsimile function is executed in the multi-function peripheral 100, image data generated by the reading unit 102 is output to the communication unit 104 and transmitted to a destination via the communication unit 104. In a case where processing related to the printing function is executed in the multi-function peripheral 100, the image forming unit 103 prints an image on a paper sheet based on image data input from a personal computer or the like. The paper sheet on which an image is printed is discharged to the paper sheet discharging unit 152.

In addition, a feeding unit in which a paper sheet is loaded, a paper sheet transport mechanism that transports a paper sheet to the image forming unit 103 and the paper sheet discharging unit 152, and the like are provided inside the main body 150.

(Operation Panel 120)

The multi-function peripheral 100 includes the operation panel 120 for a user to operate the multi-function peripheral 100. The operation panel 120 is an example of a user interface. The user interface is a device for exchanging information between the multi-function peripheral 100 and a user, specifically, for inputting an operation instruction from a user to the multi-function peripheral 100 or displaying information such as a status of the multi-function peripheral 100 to a user.

Figure 3:
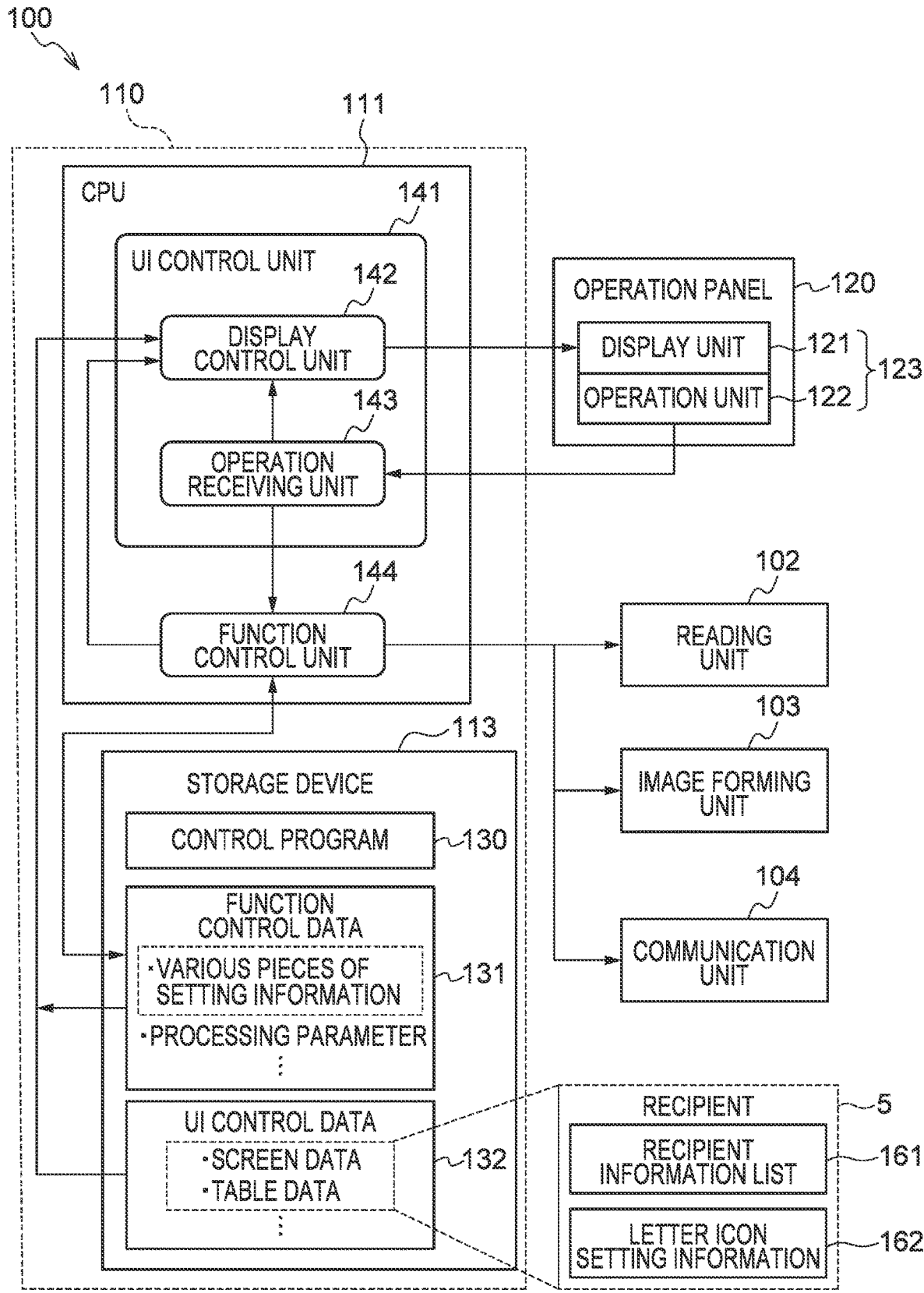
FIG. 3 is a block diagram illustrating a functional configuration of the control device used in the multi-function peripheral according to the first embodiment.

In the present embodiment, specifically, the operation panel 120 includes a display unit 121 and an operation unit 122 as illustrated in FIGS. 2 and 3.

The display unit 121 displays an operation screen, various messages such as operation guidance, and the like. The operation unit 122 is a component on which a user performs an input operation. The display unit 121 is implemented by, for example, a liquid crystal display, an organic electro luminescence (EL) display, or the like. The operation unit 122 and the display unit 121 are implemented by a touch panel display 123 in which both the operation unit 122 and the display unit 121 are integrated. The operation unit 122 is a resistive type touch panel, a capacitive type touch panel, or the like, and detects a touch operation of a user. A region where an operation screen of the display unit 121 is displayed and a region where a touch operation of the operation unit 122 can be detected overlap with each other in the touch panel display 123. As a result, once a user performs a touch operation on an operation screen displayed on the display unit 121, the operation unit 122 detects the touch operation performed on the operation screen and a position at which the touch operation is performed on the operation screen, and outputs a detection signal to the control device 110.

Examples of the touch operation of the user include operations such as tapping, flicking, sliding, and dragging. The tapping operation is an operation of touching the screen of the display unit 121 with a finger. The flicking operation is an operation of touching the screen of the display unit 121 in such a way as to flick the screen with a finger. The sliding operation is an operation of moving a finger in a state of touching the screen of the display unit 121 with the finger. The dragging operation is an operation for moving an image such as an icon displayed on the display unit 121. The dragging operation is an operation of touching an image displayed on the display unit 121 with a finger, then moving the finger touching the image, and then releasing the finger from the image. The operation unit 122 that is a touch panel outputs, as a detection signal, a movement locus of a finger associated with these touch operations in an operation screen. Note that the touch operation may be not only an operation using a finger of a user but also an operation using a tool such as a touch pen. A user can operate the multi-function peripheral 100 via an operation image (graphical user interface (GUI) displayed on the operation panel 120. Furthermore, the multi-function peripheral 100 can be operated via an operation screen displayed on a display included in an external apparatus (not illustrated) in which an operation application for the multi-function peripheral 100 is installed.

The operation panel 120 further includes an operation key 124 disposed outside the screen of the display unit 121 as illustrated in FIG. 1. Examples of the operation key 124 include a power key for supplying power to the multi-function peripheral 100, a cancel key for canceling various executions, and the like. As described above, the operation panel 120 according to the present embodiment includes a mechanical operation unit in addition to the touch panel display 123 including the operation unit 122.

Figure 4:
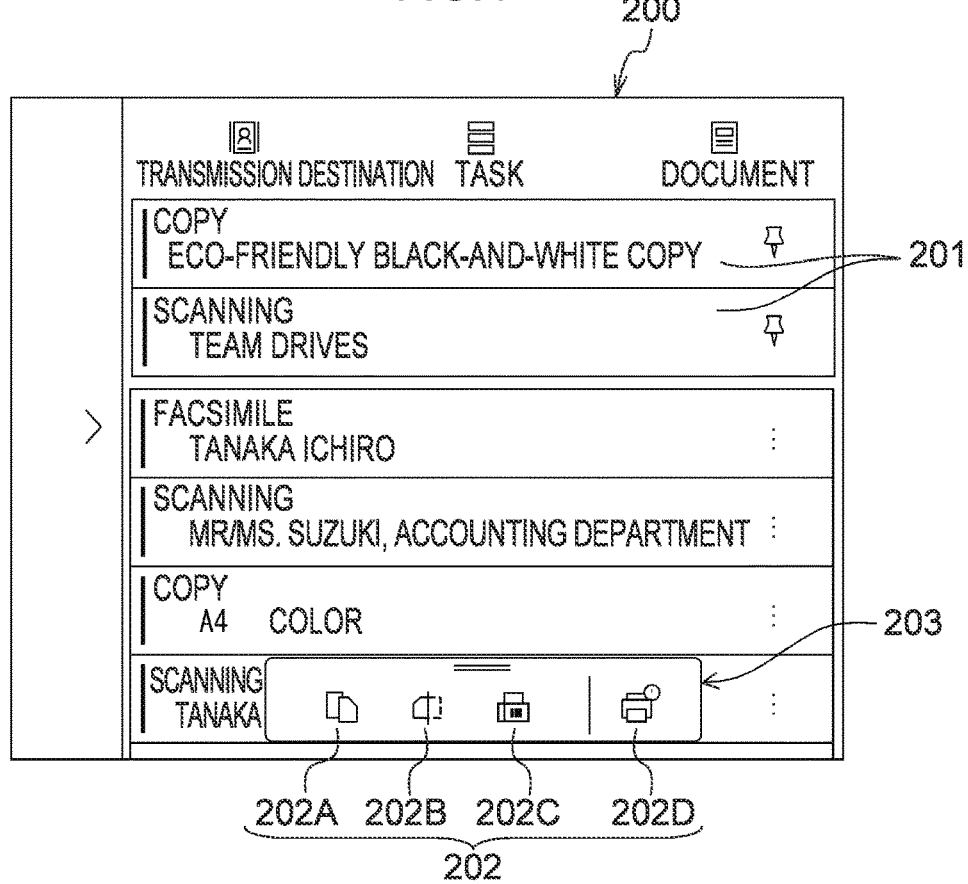
FIG. 4 is a view illustrating a task item selection screen in an operation screen of the multi-function peripheral according to the first embodiment.

The display unit 121 can display, for example, various operation screens such as a task item selection screen 200 illustrated in FIG. 4. The "operation screen" of the disclosure only needs to be a screen used for operating the multi-function peripheral 100, and is a concept including not only an operation screen for operation provided in the multi-function peripheral 100 itself but also a screen provided in an apparatus for remotely operating the multi-function peripheral 100.

(Control Device 110)

The control device 110 is a device that controls each unit of the multi-function peripheral 100 including the operation panel 120. Specifically, the control device 110 includes a central processing unit (CPU) 111, a memory 112, and a storage device 113 as illustrated in FIG. 2. The control device 110 controls the multi-function peripheral 100 based on information stored in the storage device 113.

The storage device 113 stores various programs including a control program 130 and various pieces of data including function control data 131 and user interface (UI) control data 132. The control program 130 is a program that causes a computer including the CPU 111 to function as the control device 110. The function control data 131 is data used to control the reading unit 102, the image forming unit 103, and the communication unit 104, and includes various pieces of setting information, processing parameters, and the like. The processing parameter is, for example, a parameter used when image correction processing such as gain correction, contrast correction, white balance correction, or gamma correction is executed.

The various pieces of setting information include setting information that specifies processing conditions for each of the copy function, the scanning function, the printing function, and the like implemented by the reading unit 102, the image forming unit 103, and the communication unit 104. For example, in the case of the copy function and the printing function, the setting information is setting information that specifies processing conditions such as paper sheet size setting and color setting (for example, black-and-white copy or color copy), and in the case of the scanning function, the setting information is setting information that specifies processing conditions such as reading resolution setting and color setting (for example, black-and-white reading or color reading). The setting information includes user setting information set by a user in addition to initial setting information. The various pieces of setting information also include a history of user setting information used by a user in the past.

In the control device 110, setting items for setting processing conditions for various functions are stored for each function in various pieces of setting information of the function control data 131 and the UI control data 132 in order to enable setting of various functions of the multi-function peripheral 100 to be performed sequentially. The setting item is an item for performing an operation of setting processing conditions for various functions of the multi-function peripheral 100. The multi-function peripheral 100 of this example has four main functions of the multi-function peripheral 100 including the copy function, the scanning function, the facsimile function, and the printing function, and a processing condition can be set for each of these four functions. An item for specifying the processing condition is the setting item. For example, in a case where the copy function and the printing function are selected as the functions, a paper sheet size, a color mode (for example, black-and-white copy or color copy), and the like are set as processing conditions.

The UI control data 132 includes various pieces of screen data for configuring an operation screen displayed by the display unit 121 and various pieces of table data defining various setting items and the like displayed in an operation screen. Specifically, the storage device 113 is implemented by a recording device such as a hard disk drive (HDD), a solid state drive (SSD), or a flash memory.

The table data of the UI control data 132 stores a recipient information list 161 for performing data communication or facsimile communication with an external apparatus. The recipient information list 161 is a list in which a plurality of pieces of recipient information are recorded. The recipient indicates a communication destination (also referred to as a transmission destination) of data communication or facsimile communication. The recipient information includes, for example, address information of a communication destination necessary for communication, such as a recipient name, a FAX number, and an e-mail address. A user can register the recipient information in the UI control data 132 in advance if necessary. The recipient information list 161 will be described later (see FIG. 7). In the multi-function peripheral 100, for example, in the case of transmitting image data or the like read using a scanner function to an external apparatus by data communication or facsimile communication, the registered recipient information list 161 is loaded from the UI control data 132, and a recipient selection screen 300 (see FIG. 6) in which a plurality of recipients are arranged in a list form is generated. The recipient selection screen 300 is displayed on the operation panel 120. A user can designate a communication destination of data communication or facsimile communication by selecting a desired recipient from a plurality of recipients displayed in the recipient selection screen 300.

Image data of the UI control data 132 stores letter icon setting information 162. The letter icon setting information 162 is information that specifies the type of an icon to be displayed for a recipient displayed in the recipient selection screen 300. The letter icon setting information 162 will be described later. Image data of the UI control data 132 stores recipient screen data for the recipient selection screen for selecting a recipient.

The memory 112 is a work area for the CPU 111 to execute various programs, and temporarily records various programs or various pieces of data when the CPU 111 executes processing. The memory 112 includes at least one of a read only memory (ROM), a random access memory (RAM), a hard disk drive (HDD), or the like as a storage medium. The CPU 111 reads various programs including the control program 130 from the storage device 113 to the memory 112, and executes the program by using the memory 112 as a work area.

In the control device 110, the CPU 111 executes the control program 130 to implement various functions for controlling the multi-function peripheral 100. Hereinafter, a functional configuration implemented by cooperation of the CPU 111 as a hardware resource and the control program 130 as a software resource will be described. FIG. 3 is a block diagram illustrating a functional configuration of the CPU 111, and is a block diagram mainly illustrating a functional configuration that implements control of the operation panel 120.

As illustrated in FIG. 3, in the control device 110, the CPU 111 functions as a UI control unit 141 and a function control unit 144 by executing the control program 130.

The function control unit 144 controls the reading unit 102, the image forming unit 103, and the communication unit 104 while referring to the function control data based on an operation instruction input from the UI control unit 141. In addition, the function control unit 144 outputs, to the UI control unit 141, a processing execution result in the reading unit 102, the image forming unit 103, and the communication unit 104, a status, and the like.

The UI control unit 141 receives an operation instruction input from the operation panel 120 and outputs the received operation instruction to the function control unit 144. The UI control unit 141 controls the touch panel display 123. The UI control unit 141 includes a display control unit 142 and an operation receiving unit 143 as the functional configuration.

The operation receiving unit 143 receives an operation instruction according to a user's operation input from the operation panel 120, the user's operation input including a user's touch operation detected by the operation unit 122 of the touch panel display 123.

The display control unit 142 performs control to display various operation screens on the display unit 121 of the touch panel display 123 with reference to the function control data 131 and the UI control data 132. The control device 110 including the display control unit 142 is an example of a display control device according to the technology of the disclosure.

Specifically, once the operation receiving unit 143 receives an operation of supplying power to the multi-function peripheral 100, the display control unit 142 causes the display unit 121 to display the task item selection screen 200 (see FIG. 4) as a top screen, as an example. As illustrated in FIG. 4, the task item selection screen 200 is a screen for a user to select and operate a task item 201 and the like to be executed by the multi-function peripheral 100. Here, a task is processing executed by the multi-function peripheral 100 after a user sets a processing condition for a main function of the multi-function peripheral 100. Then, an item including information indicating the content of this processing is referred to as the task item 201. For example, in the case of the copy function, which is one of the main functions of the multi-function peripheral 100, processing executed by the multi-function peripheral 100 after a user sets the processing conditions such as paper sheet size setting and color setting is the task of the copy function, and an item indicating the content of the task is the task item 201. Similarly, in the case of the scanning function, processing executed by the multi-function peripheral 100 after a user sets the processing conditions such as reading resolution setting and color setting is the task of the scanning function, and an item indicating the content of the task is the task item 201. Similarly, in the case of the facsimile function, processing executed by the multi-function peripheral 100 after a user sets the processing conditions such as a data file to be processed such as a document to be transmitted, a transmission destination, reading resolution setting, and color setting is the task of the facsimile function.

As described above, there are various types of tasks and task items 201 indicating the contents of the tasks according to the type of function and the processing condition. A plurality of task items 201 for different types of functions and different processing conditions are displayed in the task item selection screen 200. The task item selection screen 200 is a selection screen for selecting one task item 201 from the plurality of task items 201 in the case of causing the multi-function peripheral 100 to execute one task. In this example, a plurality of task items 201 corresponding to an operation history are displayed in a list form in the task item selection screen 200.

In addition, an icon window 203 is displayed in the task item selection screen 200 while being superimposed on a portion where the task item 201 is displayed. As an example, the icon window 203 is displayed in the form of a floating window whose display position can be adjusted in the task item selection screen 200. The icon window 203 is disposed at a lower end portion of the task item selection screen 200.

An icon 202 functions as a selection button for a user to select a function to be executed by the multi-function peripheral 100.

FIG. 4 illustrates icons 202A, 202B, 202C, and 202D as the icons 202. These icons correspond to the copy function, the scanning function, the facsimile function, and the printing function, which are the four main functions of the multi-function peripheral 100. The icon 202A is a selection button for selecting the copy function, and the icon 202B is a selection button for selecting the scanning function. The icon 202C is a selection button for selecting the facsimile function, and the icon 202D is a selection button for selecting the printing function. The icon 202 includes various icons other than the four icons 202A, 202B, 202C, and 202D, and the various icons can be displayed by setting, for example. Hereinafter, in a case where there is no need to distinguish the types of the icons 202, the four icons 202A, 202B, 202C, and 202D are simply referred to as the icons 202.

Figure 5:
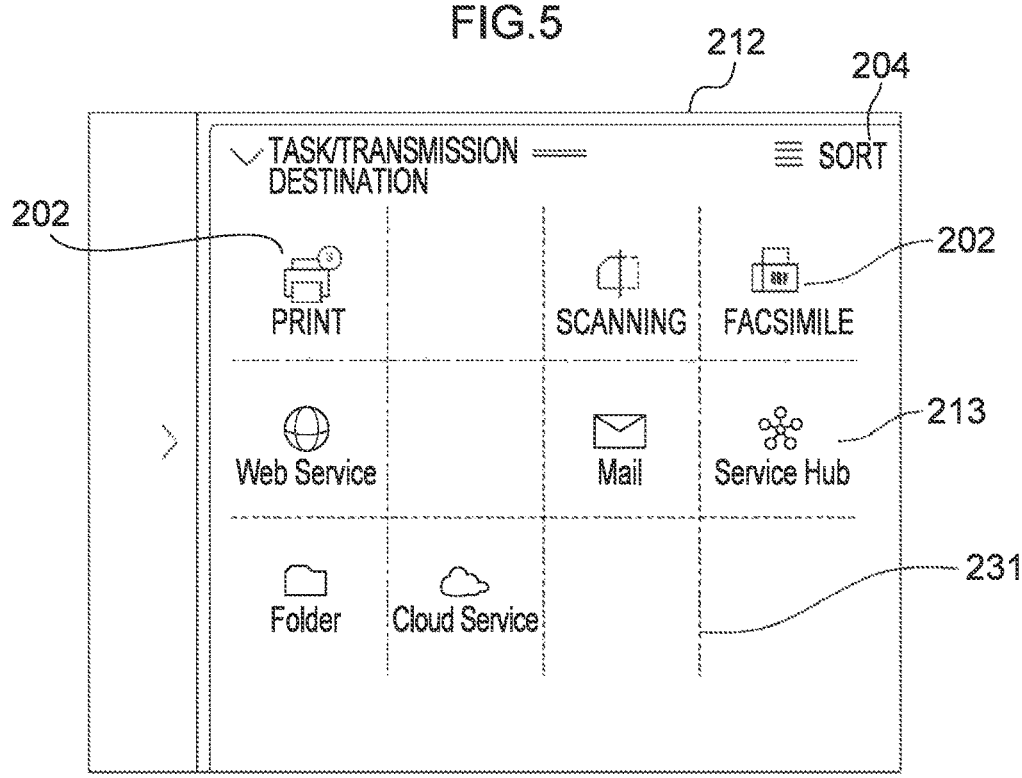
FIG. 5 is a view illustrating a function selection screen in the operation screen of the multi-function peripheral according to the first embodiment.

FIG. 5 is a view illustrating a function selection screen 212. The function selection screen 212 is a selection screen for a user to select various functions to be executed by the multi-function peripheral 100. The display control unit 142 shifts an operation screen displayed on the display unit 121 from the task item selection screen 200 to the function selection screen 212 by a predetermined operation performed on the task item selection screen 200. The predetermined operation is, for example, a flicking operation performed on a preset region of the task item selection screen 200. The function selection screen 212 includes a plurality of sections 213 in which the icons 202 corresponding to various functions to be executed by the multi-function peripheral 100 are disposed, and is a screen for a user to select an icon 202. In FIG. 5, a frame 231 of a section 213 is indicated by a broken line, but the broken line is not actually displayed. It is a matter of course that the frame 231 may be displayed.

The icons 202 are also displayed in the icon window 203 in the task item selection screen 200 illustrated in FIG. 4, but the icons 202 displayed in the icon window 203 correspond to part of the icons 202 displayed in the function selection screen 212. As described above, the icons 202 displayed in the icon window 203 correspond to the four main functions of the multi-function peripheral 100 in this example, and as the icon window 203 is provided in the task item selection screen 200, it is possible to operate the four main functions without switching to the function selection screen 212.

Once a desired icon 202 is operated on the icon window 203 of the task item selection screen 200 or the function selection screen 212, transition to a setting screen corresponding to the function of the operated icon 202 is made. A processing condition for the function selected by the icon 202 can be set in the setting screen.

FIG. 6 illustrates the recipient selection screen 300 as an example of a setting screen in a case where the icon 202 corresponding to the facsimile function is selected. The recipient selection screen 300 is a setting screen for setting a communication destination which is one of the processing conditions for the facsimile function. The recipient selection screen 300 can also be referred to as an address list or an address book since a plurality of recipients 5 are displayed in a list form.

In the multi-function peripheral 100, for example, in the case of transmitting image data or the like read using the scanner function to an external apparatus by facsimile communication, the display control unit 142 loads the registered recipient information list 161 from the UI control data 132. The display control unit 142 generates the recipient selection screen 300 based on the recipient information list 161 and displays the recipient selection screen 300 on the operation panel 120. The recipient selection screen 300 is an operation screen displayed on the operation panel 120 in order to perform an operation to designate a recipient as a transmission destination.

As illustrated in FIG. 6, the recipient selection screen 300 is an example of an operation screen in which an operation image in a case where a recipient name which is a name of a recipient is registered in Japanese. A recipient search box 3 for inputting a keyword for searching for a recipient as a transmission destination and a recipient addition button 4 for screen transition to a registration screen for registering a new recipient are displayed side by side on the upper side of the recipient selection screen 300. A plurality of recipients 5 are arranged and displayed in a list form below the recipient search box 3 and the recipient addition button 4 in the recipient selection screen 300.

The recipient 5 has a horizontally long rectangular region for each communication destination. A recipient name 51, a FAX number 52, and an e-mail address 53 that are written horizontally are displayed in the region of the recipient 5, and a letter icon 54 is further displayed in front of the recipient name 51. When registered in Japanese, the recipient name 51 is written in Japanese. In this example, the recipient name 51 written with kanji letters is displayed for the recipient 5. The front of the recipient name 51 is an area on the left side of an initial letter of the recipient name 51 in a case where the recipient name 51 is written horizontally. For example, as illustrated in FIG. 6, for a recipient 5 for which "AOYAMA" is written horizontally as the recipient name 51, the front of the recipient name 51 is an area on the left side of "AO" that is an initial letter of "AOYAMA". For the recipient 5 for which the recipient name 51 is written horizontally, the letter icon 54 is preferably displayed at the left end of the recipient 5 as illustrated in FIG. 6. The front of the recipient name 51 means an area above an initial letter of the recipient name 51 in a case where the recipient name is written vertically.

The letter icon 54 includes a combination of an initial letter 54*a* of the recipient name 51 in a case where the recipient name 51 is written with phonetic characters, and a FIG. 54*b*. In other words, the letter icon 54 includes a combination of the initial letter 54*a* that is a character element and the FIG. 54*b* that is a figure element. Here, the phonetic character is also referred to as a phonetic alphabet, and refers to a character representing a phoneme or a syllable by one character. The kanji letters are representational characters representing meanings, and the phonetic characters include phonetic letters (kana) of kanji letters, English alphabet letters, and the like. The phonetic letters of the kanji letters "AOYAMA" exemplified in FIG. 6 are "AOYAMA" when written in hiragana. The initial letter of the recipient name 51 included in the letter icon 54 is the initial letter of the recipient name 51 in a case where the recipient name 51 is written with phonetic letters which are phonetic characters. In this example, the initial letter of the recipient name 51 is "A" that is the initial letter of the recipient name 51 in a case where the recipient name 51 of "AOYAMA" is written as "AOYAMA" which are phonetic letters of "AOYAMA". The phonetic letters include katakana letters in addition to hiragana letters.

In the first embodiment, the initial letter 54*a* is a hiragana letter, and the FIG. 54*b* is a circle. The FIG. 54*b* included in the letter icon 54 is colored in a different color for each Japanese syllable as the initial letter 54*a*. For example, in a case where the recipient name 51 is "AOYAMA "", "A" that is the initial letter 54***a* of the phonetic letters "AOYAMA "" is displayed as a white letter in the FIG. 54***b* that is a circle colored in red. For example, in a case where the recipient name 51 is "IKARI ○○", "I" that is the initial letter 54*a* of the phonetic letters "IKARI ○○" is displayed as a white letter in the FIG. 54*b* that is a circle colored in blue. For example, in a case where the recipient name 51 is "UEMURA ○△", "U" that is the initial letter 54*a* of the phonetic letters "UEMURA ○△" is displayed as a white letter in the FIG. 54*b* that is a circle colored in purple. A letter icon 54 corresponding to each recipient 5 is configured as described above. Similarly, for recipients 5 whose phonetic letters of the recipient names 51 are letters after "E", an initial letter 54*a* of phonetic letters of each recipient name 51 is displayed as a white letter in a FIG. 54*b* that is a circle colored in a different color for each Japanese syllable, thereby forming a letter icon 54 corresponding to each recipient 5 (not illustrated). That is, the FIG. 54*b* included in the letter icon 54 has a different form for each Japanese syllable as the initial letter 54*a*.

The recipients 5 are sorted in a predetermined display order based on the initial letter 54*a* included in the letter icon 54. The sorted recipients 5 are displayed in the recipient selection screen 300. In this example, the predetermined display order is the Japanese syllabary order of the initial letters 54*a* of the phonetic letters. The recipients 5 are only required to be sorted in the Japanese syllabary order of the initial letters 54*a* included in the letter icons 54 and displayed in the operation screen. The letters to be sorted may be letters included in the letter icons 54 or may be the phonetic letters of the recipient names 51. In either case, the recipients 5 are sorted in the Japanese syllabary order based on the initial letters 54*a* included in the letter icons 54 as a result.

In a case where the initial letters have the same order, the recipients 5 are sorted in the Japanese syllabary order based on a letter next to the initial letter. In the example of the recipient selection screen 300 illustrated in FIG. 6, "AOYAMA "", "ATO □□", and "ANDO ××" whose initial letters of the recipient names 51 are "A" are displayed in the Japanese syllabary order of the second characters "O", "TO", and "N". Control is performed such that the recipients 5** are sorted and displayed in the Japanese syllabary order of the third characters in a case where the second characters are the same or in the Japanese syllabary order of the fourth characters in a case where the third characters are the same.

As described above, the display control unit 142 displays, for a recipient 5, a recipient name 51 which is a name of the recipient 5, and displays, in front of the recipient name 51, a letter icon 54 including a combination of an initial letter 54*a* of the recipient name 51 in a case where the recipient name 51 is written with phonetic characters and a FIG. 54*b*. The recipients 5 are sorted in a predetermined display order based on the initial letters 54*a* included in the letter icons 54, and the sorted recipients 5 are displayed in the recipient selection screen 300 which is an example of the operation screen.

A user can scroll through a plurality of recipients 5 displayed in the recipient selection screen 300 by touching the recipient selection screen 300 in which the plurality of recipients 5 are displayed in a list form and performing a flicking operation or a swipe operation in the vertical direction. The user finds a desired recipient 5 from the recipients 5 displayed in the recipient selection screen 300 and performs a tapping operation to select the recipient 5, thereby specifying a communication destination.

A registration correction button 55 for transition to a screen for correcting a registration content of a recipient 5 is provided at the right end in the region of each recipient 5. The registration correction button 55 is displayed as, for example, three vertically arranged points. Once the registration correction button 55 is tapped, screen transition to a screen (not illustrated) for correcting a registration content of a recipient 5 corresponding to a region where the registration correction button 55 is displayed is made, and address information such as a recipient name 51, a FAX number 52, and an e-mail address 53 related to the recipient 5 can be corrected, if appropriate, in the transition destination screen.

FIG. 7 illustrates the recipient information list 161 recorded in the UI control data 132. As illustrated in FIG. 7, the recipient information list 161 stores, as individual recipient information, name information 61 indicating a name of a recipient name 51, phonetic letter information 62 indicating phonetic letters of a recipient name 51, telephone number information 63 indicating a FAX number 52, e-mail address information 64 indicating an e-mail address 53, and the like in association with each other.

FIG. 8 illustrates the letter icon setting information 162 included in the UI control data 132. As illustrated in FIG. 8, the letter icon setting information 162 stores initial letter information 71 corresponding to an initial letter 54a of a recipient name 51, figure information 72 assigned for each Japanese syllable as the initial letter 54a, color information 73, and the like in association with each other. The figure information 72 corresponds to the FIG. 54b. The figure information 72 and the color information 73 specify a display form of a letter icon 54. The letter icon setting information 162 is set in advance at the time of manufacturing the multi-function peripheral 100, for example. The setting may be changed by a user.

Figure 9:
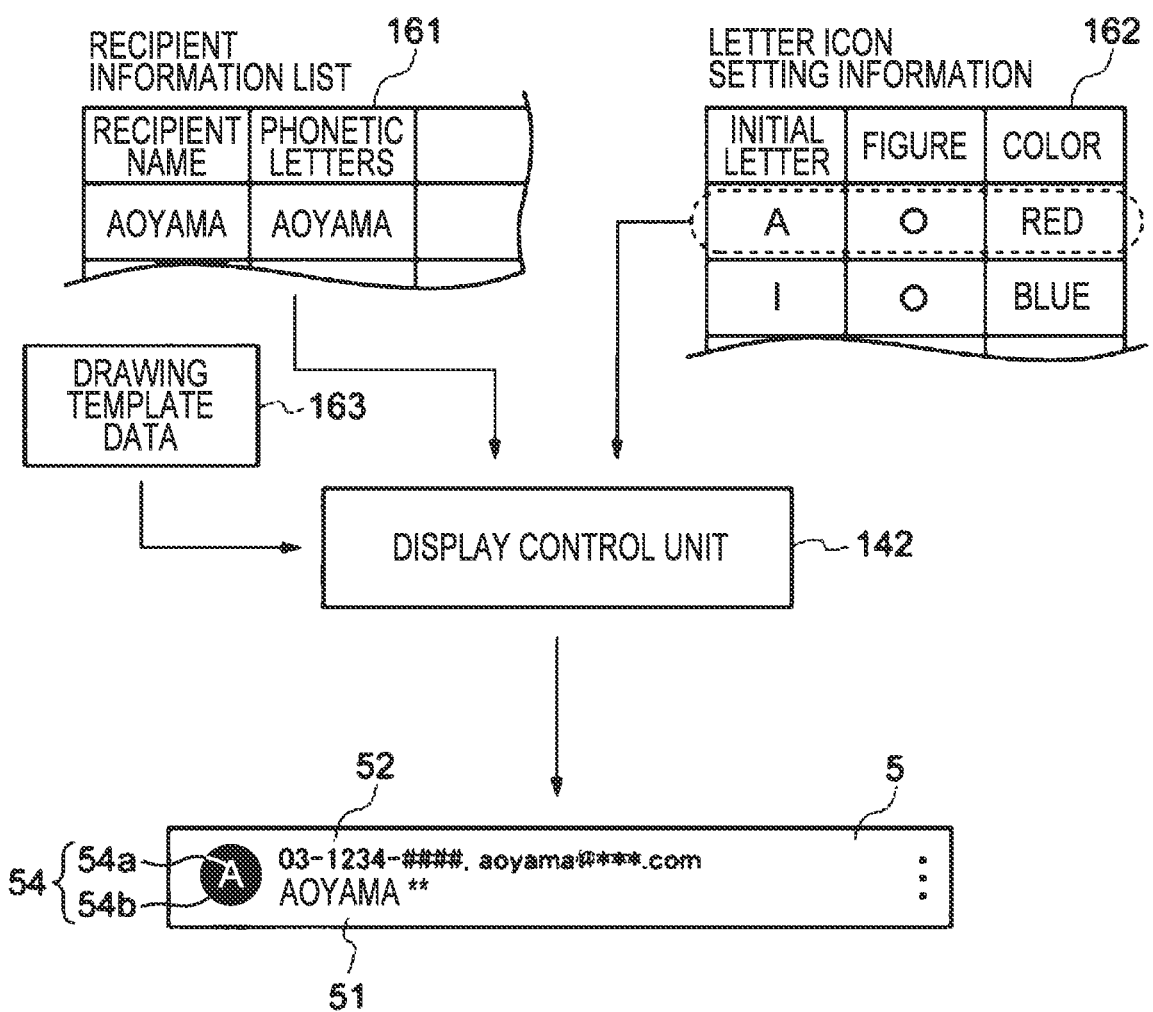
FIG. 9 is a block diagram illustrating a functional configuration of a display control unit of the multi-function peripheral according to the first embodiment.

FIG. 9 is a diagram conceptually illustrating an example of a method of generating the recipient selection screen 300 by the display control unit 142. The display control unit 142 reads the recipient information list 161 (see FIG. 7), the letter icon setting information 162 (see FIG. 8), and screen template data 163 for the recipient selection screen 300 from the UI control data 132. The display control unit 142 reads one piece of recipient information from the recipient information list 161, and combines the read recipient information with the region of the recipient 5 of the screen template data. The display control unit 142 reads the initial letter information 71, the figure information 72, and the color information 73 from the letter icon setting information 162 based on the initial letter of the phonetic letters of the recipient information. The display control unit 142 generates the letter icon 54 by combining the initial letter information 71, the figure information 72, and the color information 73, and disposes the generated letter icon 54 in front of the recipient name 51 of the recipient 5. As a result, the recipient 5 for one piece of recipient information is generated. The recipients 5 for all pieces of recipient information are generated by repeating such processing. The display control unit 142 displays the generated recipients 5 for all pieces of recipient information, and arranges the recipients 5 in a list form, thereby generating the recipient selection screen 300.

Next, the operation of the multi-function peripheral 100 will be described with reference to the flowchart of FIG. 10.

Figure 10:
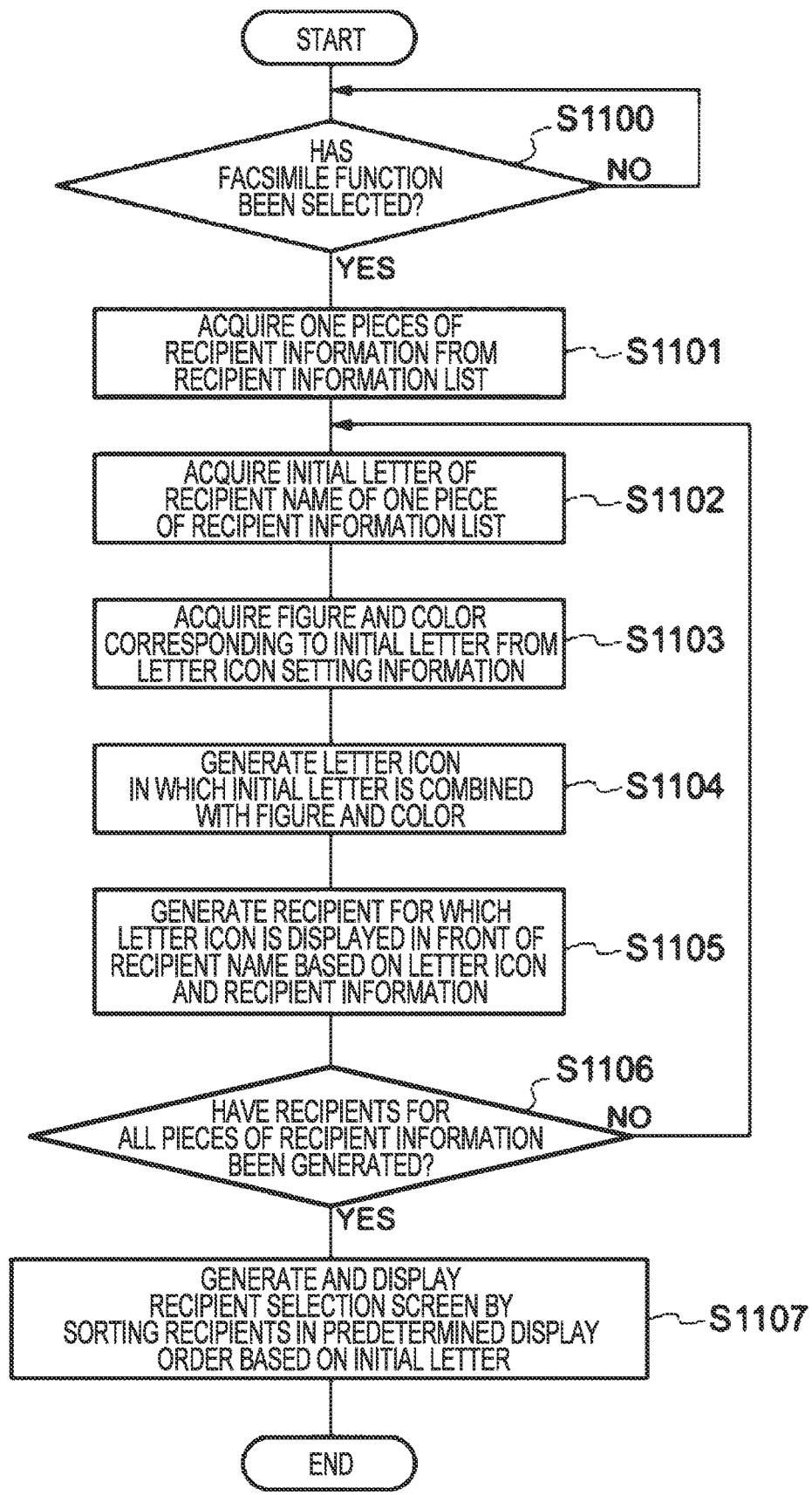
FIG. 10 is a flowchart illustrating a flow of display control processing for a facsimile function executed by the control device.

FIG. 10 is a flowchart illustrating a flow of control processing for a function executed by the CPU 111 of the control device 110. As illustrated in FIG. 10, the CPU 111 determines whether or not the facsimile function has been selected (Step S1100). For example, in a case where the icon 202 for the facsimile function has been selected as one of the main functions in the task item selection screen 200 illustrated in FIG. 4 or the function selection screen 212 illustrated in FIG. 5, the CPU 111 determines that the facsimile function has been selected.

In a case where the facsimile function has not been selected (NO in Step S1100), the CPU 111 waits until the facsimile function is selected.

In a case where the facsimile function has been selected (YES in Step S1100), the CPU 111 acquires one piece of recipient information from the recipient information list 161 (Step S1101). For example, the CPU 111 acquires one piece of recipient information from the recipient information list 161 stored in the UI control data 132.

The CPU 111 acquires an initial letter of one piece of recipient information (Step S1102). In a case where the recipient name 51 is written with kanji letters as in this example, the CPU 111 acquires an initial letter of phonetic letters of the kanji letters as the initial letter of the recipient name 51 of one piece of recipient information.

The CPU 111 acquires a figure and a color corresponding to the initial letter from the letter icon setting information 162 (Step S1103). For example, the CPU 111 acquires a figure and a color corresponding to the initial letter of the recipient name 51 from the initial letter information 71, the figure information 72, and the color information 73 of the letter icon setting information 162.

The CPU 111 generates a letter icon 54 in which the initial letter is combined with the figure and the color (Step S1104). For example, the CPU 111 combines the initial letter 54a, the FIG. 54b, and the color of the letter icon setting information 162, thereby generating the letter icon 54.

The CPU 111 generates a recipient 5 based on the letter icon 54 and the recipient information (Step S1105). For example, the CPU 111 generates a recipient 5 for which the letter icon 54 is disposed in front of the recipient name 51 as illustrated in FIG. 6.

The CPU 111 determines whether or not recipients for all pieces of recipient information have been generated (Step S1106).

In a case where the recipients for all pieces of recipient information have not been generated (NO in Step S1106), the CPU 111 returns to the processing of Step S1101.

In a case where the recipients for all pieces of recipient information have been generated (YES in Step S1106), the CPU 111 generates and displays the recipient selection screen 300 by sorting the recipients 5 in a predetermined display order based on the initial letter included in the letter icon 54 (Step S1107). For example, the recipient selection screen 300 is generated and displayed as illustrated in FIG. 6. In the recipient selection screen 300, a recipient name 51 is displayed for a recipient 5, and a letter icon 54 including a combination of an initial letter 54a of phonetic letters of the recipient name 51 written with kanji letters and a FIG. 54b is displayed, the initial letter 54a being the initial letter of the recipient name 51. The recipients 5 are sorted in the Japanese syllabary order based on the initial letter 54a included in the letter icon 54, and the sorted recipients 5 are displayed in the recipient selection screen 300. In a case where a communication destination is designated by a user selecting a recipient 5 in the recipient selection screen 300, the CPU 111 executes the facsimile function for the designated communication destination.

As described above, in the multi-function peripheral 100 which is an example of the information communication apparatus, the CPU 111 displays, for a recipient 5, a recipient name 51 which is a name of the recipient 5, and displays, in front of the recipient name 51, a letter icon 54 including a combination of an initial letter 54a of the recipient name 51 in a case where the recipient name 51 is written with phonetic characters and a FIG. 54b. The CPU 111 sorts the recipients 5 in a predetermined display order based on the initial letters 54a included in the letter icons 54 and displays the sorted recipients 5 in the recipient selection screen 300 which is an example of the operation screen. Therefore, a user of the multi-function peripheral 100 can immediately understand the attribute (for example, a letter that a recipient starts with) of the recipient name 51 of each recipient 5 by visually recognizing the letter icon 54.

In the recipient selection screen 300, in a case where a recipient name 51 written with kanji letters is displayed for a recipient 5, an initial letter 54a of the recipient name 51 is an initial letter 54a of phonetic letters of the kanji letters of the recipient name 51, and a letter icon 54 includes a combination of the initial letter 54a of the phonetic letters and a FIG. 54b. The recipients 5 are sorted in the Japanese syllabary order based on the initial letter 54a in the recipient selection screen 300. A user can instantaneously understand a Japanese syllable that a corresponding recipient 5 starts with by visually recognizing the letter icon 54 displayed in front of the recipient name 51 of each recipient 5 displayed in the recipient selection screen 300. Therefore, for example, it is not necessary to display an index row that requires a processing time for display in the address book. As an example, a letter icon 54 is displayed for each recipient 5 in a recipient region on the left-front side of a recipient name 51 in the recipient selection screen 300 illustrated in FIG. 6. Therefore, it is possible to immediately understand the attribute of a recipient name 51 of each recipient 5, that is, an initial letter of phonetic letters of the recipient name 51 in the case of the recipient name 51 written with kanji letters, by visually recognizing the letter icon 54, the initial letter being a Japanese syllable.

Since the letter icon 54 is displayed for all the registered recipients 5 and has a one-to-one relationship with each recipient 5, it is possible to immediately understand a letter that the recipient 5 for which the letter icon 54 is displayed starts with in the case of a recipient written in Japanese letters such as kanji letters, hiragana letters, or katakana letters, by visually recognizing the letter icon 54, which results in an excellent search performance.

The FIG. 54b included in the letter icon 54 has a different form for each Japanese syllable as the initial letter 54a. In this example, the FIG. 54b is colored in a different color for each Japanese syllable. Therefore, even when scrolling through an address list in which the recipients 5 are arranged in a list form, it is easy to notice the color change of the letter icon 54. As a result, in the case of a recipient 5 whose recipient name 51 is registered in kanji letters, it is possible to recognize that a group of recipients 5 grouped for each initial letter 54a of phonetic letters of the recipient name 51 is switched to a different group. Therefore, it is possible to improve operability when searching for a desired recipient 5 by scrolling through an address list.

The multi-function peripheral 100 includes the control device 110 and the communication unit 104 that transmits data to a transmission destination designated by the control device 110 and receives other data from the outside. Therefore, the multi-function peripheral 100 can quickly select a desired recipient 5 and transmit data.

Here, a recipient selection screen of a multi-function peripheral according to a comparative example illustrated in FIG. 13 will be described.

Figure 13:
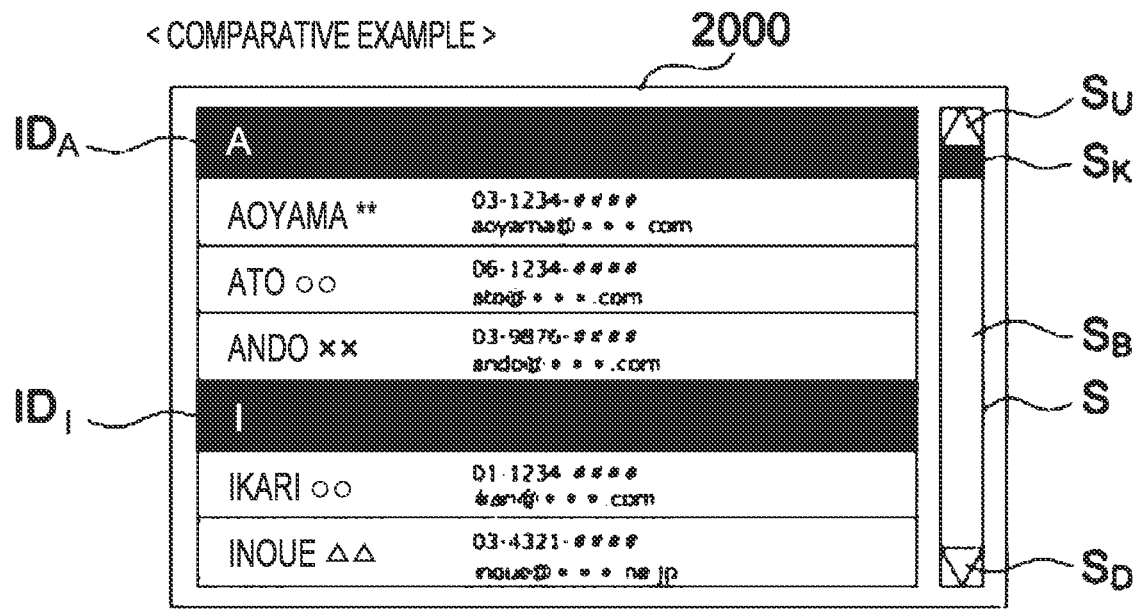
FIG. 13 is a view illustrating a recipient selection screen in which a part of an address book is displayed according to a comparative example.

FIG. 13 illustrates an example of an address book in which index rows in the Japanese syllabary order are displayed in a recipient operation screen 2000 of a touch-panel-type display included in the multi-function peripheral according to the comparative example. As illustrated in FIG. 13, an index row "$ID_A$" indicating that a group obtained by grouping recipients registered with recipient names starting with "A" includes recipients that start with "A" is displayed above the corresponding recipient group in the recipient operation screen 2000. An index row "$ID_I$" indicating that a group of recipients registered with recipient names starting with "I" includes recipients starting with "I" is displayed above the corresponding recipient group. A user can scroll through an address book displayed in the recipient operation screen 2000 in the vertical direction by directly touching the address book displayed in the recipient operation screen 2000 and performing a flicking operation or a swipe operation. Alternatively, it is possible to scroll through the address book displayed in the recipient operation screen 2000 in the vertical direction by appropriately operating an upward arrow $S_U$, a downward arrow $S_D$, a knob $S_K$, and a main body $S_B$ of a scroll bar S displayed on the right side of the recipient operation screen 2000 according to an operation method such as a click operation, a dragging operation, or a tapping operation.

However, it is necessary to perform processing of calculating the number of recipients grouped in each group and then displaying the index rows at appropriate positions in the address book in order to display the index rows in the address book in the recipient operation screen 2000. In addition, since this processing needs to be repeatedly performed as many times as the number of groups, there is a problem that it takes time to perform processing for displaying the index rows in a recent information communication apparatus capable of storing a huge number of recipients of up to 10,000.

Figure 14:
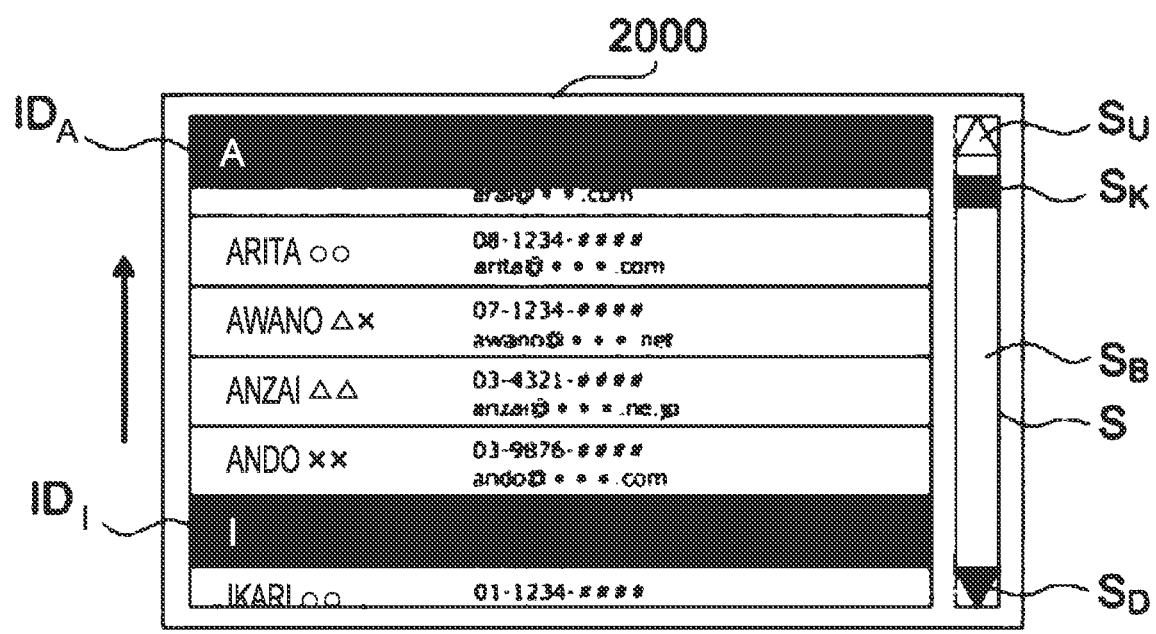
FIG. 14 is a view illustrating an example of a display state in a case where a scroll operation is performed on the address book in the recipient selection screen according to the comparative example.

In the multi-function peripheral according to the comparative example, since the size of a display unit on which the recipient operation screen 2000 is displayed is limited, the number of recipients simultaneously displayed in the recipient operation screen 2000 is naturally limited, and all the stored recipients cannot be displayed at a time. Therefore, when selecting a desired recipient from the address book displayed in the recipient operation screen 2000, it may be necessary to scroll through the address book displayed in the recipient operation screen 2000 in the vertical direction. At this time, if the index rows are scrolled together with the address book, recipients are displayed in a state in which the index rows cannot be visually recognized in the operation screen (only the recipients are displayed), and thus, it suddenly becomes difficult to determine in what unit the recipients are grouped. Therefore, it is necessary to continuously display the index rows without scrolling the index rows until the recipients displayed in the recipient operation screen 2000 are switched to recipients in the next group by a scroll operation indicated by an arrow as illustrated in FIG. 14. That is, in a case where the index rows are displayed, it is necessary to separately control and display the index rows and the address book at the time of performing a scroll operation, which also causes a problem that the control becomes complicated.

On the other hand, in the multi-function peripheral 100 according to the first embodiment, it is possible to immediately understand the attribute (for example, a letter that a recipient starts with) of the recipient name 51 of each recipient 5 by visually recognizing the letter icon 54. Therefore, it is not necessary to display the index rows in the address list, and thus, processing for displaying the address list in the recipient selection screen 300 can be performed at a higher speed than in a case where the index rows are displayed. Since it is not necessary to display the index rows even when performing a scroll operation on the address list, it is not necessary to separately display and control the index rows and the address list.

Second Embodiment

Next, a multi-function peripheral 100 according to a second embodiment will be described. In the second embodiment, the same components, members, and the like as those of the first embodiment are denoted by the same reference signs, and a detailed description thereof is omitted.

Figure 11:
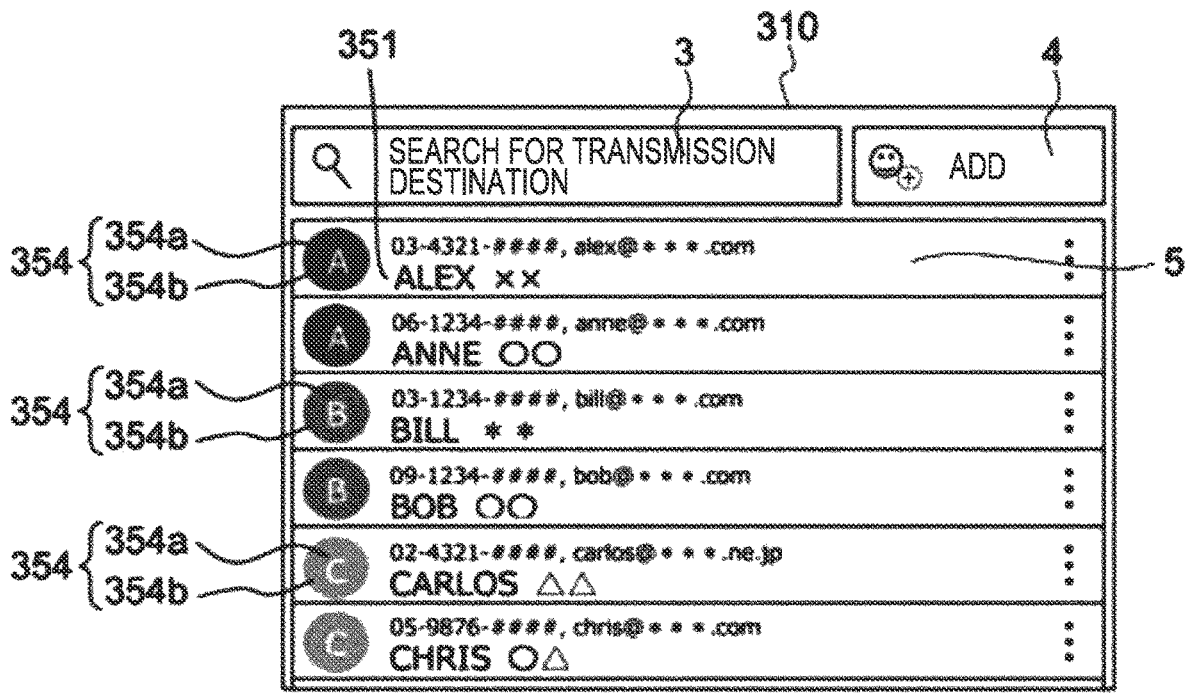
FIG. 11 is a view illustrating a recipient selection screen in which a part of an address book is displayed in a multi-function peripheral according to a second embodiment.

The multi-function peripheral 100 according to the second embodiment differs from the multi-function peripheral 100 according to the first embodiment in the operation screen in a case where the facsimile function is selected. FIG. 11 illustrates a recipient selection screen 310 as an example of an operation screen in the multi-function peripheral 100 according to the second embodiment. As illustrated in FIG. 11, the recipient selection screen 310 is an operation screen in which a recipient name 351 written with alphabet letters which are phonetic characters is displayed. In this case, the recipient name 351 written with the alphabet letters is registered in a recipient information list 161.

In a case where the recipient name 351 written with alphabet letters is displayed, the initial letter of the recipient name 351 is an initial letter 354a of the alphabet letters of the recipient name 351. A letter icon 354 includes a combination of the initial letter 354a of the alphabet letters and a FIG. 354b. In the second embodiment, the FIG. 354b is a circle. The FIG. 354b is different for each alphabet letter as the initial letter 354a. More specifically, the FIG. 354b is colored in a different color for each alphabet letter as the initial letter 354a. For example, in a case where the recipient name 351 is "ALEX ××", "A" that is the initial letter 354a thereof is displayed as a white letter in the FIG. 354b that is a circle colored in red. In a case where the recipient name 351 is "BILL ", "B" that is the initial letter 354a thereof is displayed as a white letter in the FIG. 354b that is a circle colored in blue. In a case where the recipient name 351 is "CARLOS ΔΔ", "C" that is the initial letter 354a thereof is displayed as a white letter in the FIG. 354b that is a circle colored in purple. A letter icon 354 corresponding to each recipient 5 is configured as described above. Similarly, for recipients 5 whose initial letters 354a of recipient names 351 are letters after "D", the initial letter 354a of each recipient name 351 is displayed as a white letter in a FIG. 354b that is a circle colored in a different color for each of alphabet letters, thereby forming a letter icon 354 corresponding to each recipient 5** (not illustrated).

The recipients 5 are displayed in the recipient selection screen 310 in such a manner that the initial letters 354a included in the letter icons 354 are sorted in a predetermined display order. In this example, the predetermined display order is the alphabetical order of the initial letters 354a of the recipient names 351. The recipients 5 are only required to be sorted in the alphabetical order of the initial letters 354a included in the letter icons 354 and displayed in the operation screen. Letters to be sorted may be letters included in the letter icons 354 or alphabet letters included in the recipient names 351. In either case, the recipients 5 are sorted in the alphabetical order based on the initial letters 354a included in the letter icons 354 as a result.

In a case where the initial letters have the same order, the recipients 5 are sorted in the alphabetical order based on a letter next to the initial letter. In the example of the recipient selection screen 310 illustrated in FIG. 11, "ALEX " and " ANNE ○○" whose initial letters of the recipient names 351 are "A" are displayed in the alphabetical order of the second characters "L" and "N". The recipients 5** are sorted in the alphabetical order of the third characters in a case where the second characters are the same or in the alphabetical order of the fourth characters in a case where the third characters are the same.

In a control device 110 of the multi-function peripheral 100 according to the second embodiment, recipient names 351 written with alphabet letters are stored as the recipient information list 161 in UI control data 132. The UI control data 132 stores, as letter icon setting information 162, a letter icon 354 in which an initial letter of a recipient name 351 is combined with a figure. A display control unit 142 generates the recipient selection screen 310 according to the recipient information list 161 and the letter icon setting information 162.

The multi-function peripheral 100 according to the second embodiment can obtain the following effects in addition to the effects of the configuration similar to that of the control device of the first embodiment.

In a case where a recipient name 351 written with alphabet letters is displayed, a letter icon 354 is displayed for each recipient 5 in a recipient region in front of the recipient name 351 in the recipient selection screen 310. A user can instantaneously understand an alphabet letter that a corresponding recipient 5 starts with by visually recognizing the letter icon 354 displayed in front of the recipient name 351 of each recipient 5 displayed in the recipient selection screen 310. Therefore, it is not necessary to display an index row that requires a processing time for display in the address book. More specifically, it is possible to immediately understand the attribute of a recipient name 351 of each recipient 5, that is, an alphabet letter that the recipient name 351 starts with in the case of the recipient name 351 written with alphabet letters, by visually recognizing the letter icon 354. Therefore, it is not necessary to display the index rows in the address list, and thus, processing for displaying the address list in the recipient selection screen 310 can be performed at a higher speed than in a case where the index rows are displayed. Since it is not necessary to display the index rows even when performing a scroll operation on the address list, it is not necessary to separately display and control the index rows and the address list.

Since the letter icon 354 is displayed for all the registered recipients 5 and has a one-to-one relationship with each recipient 5, it is possible to immediately understand an alphabet letter that the recipient 5 for which the letter icon 354 is displayed starts with in the case of a recipient written with alphabet letters, by visually recognizing the letter icon 354, which results in an excellent search performance.

Since the FIG. 354b included in the letter icon 354 is colored in a different color for each alphabet letter as the initial letter 54a included in the letter icon 354, it is easy to notice a color change of the letter icon 354 even when scrolling through the address list. As a result, it is possible to recognize that, in the case of a recipient 5 for which a recipient name 351 written with alphabet letters is registered, a group of recipients 5 grouped for each initial letter of a recipient name 351 has been switched to a different group, and it is thus possible to improve operability when searching for a desired recipient 5 by scrolling through an address list.

Third Embodiment

Next, a multi-function peripheral 100 according to a third embodiment will be described. In the third embodiment, the same components, members, and the like as those of the first and second embodiments are denoted by the same reference signs, and a detailed description thereof is omitted.

Figure 12:
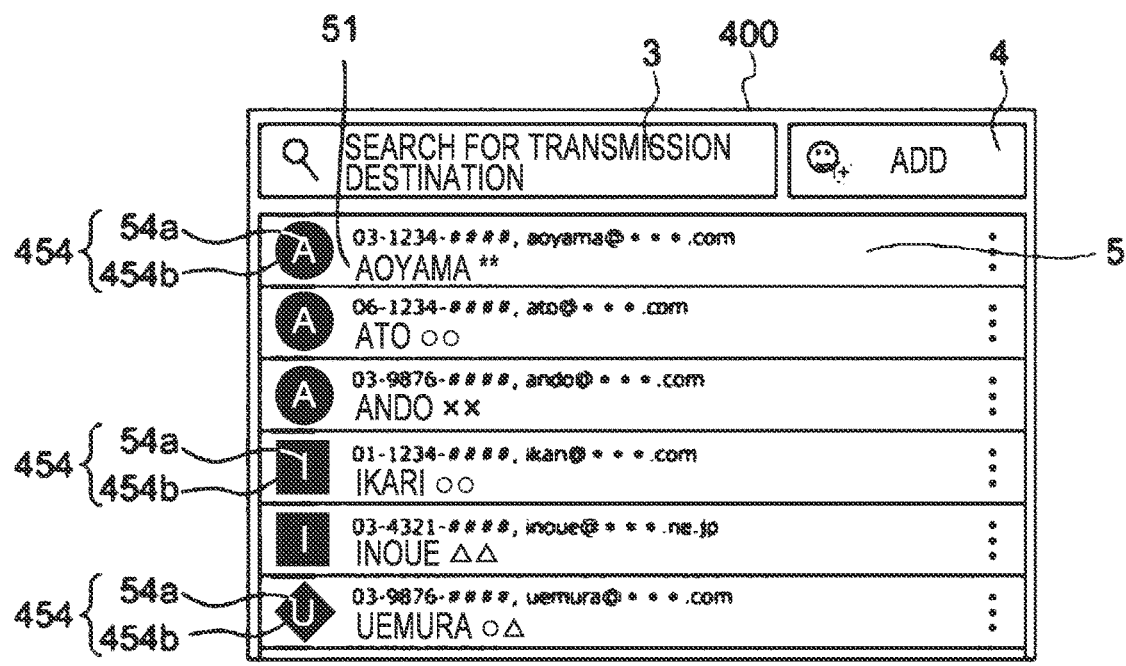
FIG. 12 is a view illustrating a recipient selection screen in which a part of an address book is displayed in a multi-function peripheral according to a third embodiment.

The multi-function peripheral 100 according to the third embodiment differs from the multi-function peripheral 100 according to the first embodiment in the operation screen in a case where the facsimile function is selected. FIG. 12 illustrates a recipient selection screen 400 as an example of an operation screen in the multi-function peripheral 100 according to the third embodiment. As illustrated in FIG. 12, the recipient selection screen 400 is an operation screen in a case where a recipient name 51 written with Japanese syllables is registered. A FIG. 454b included in a letter icon 454 is changed in the recipient selection screen 400. In the third embodiment, in a case where the recipient name 51 is "AOYAMA ", "A" that is the initial letter 54a of the phonetic letters "AOYAMA " is displayed as a white letter in the FIG. 454b that is a circle colored in red. In a case where the recipient name 51 is "IKARI ○○", "I" that is the initial letter 54a of the phonetic letters "IKARI ○○" is displayed as a white letter in the FIG. 454b that is a square colored in red. In a case where the recipient name 51 is "UEMURA ○△", "U" that is the initial letter 54a of the phonetic letters "UEMURA ○△" is displayed as a white letter in the FIG. 454b that is a rhombus colored in red. A letter icon 454 corresponding to each recipient 5 is configured as described above. Similarly, for recipients 5 whose phonetic letters of the recipient names 51 are letters after "E", an initial letter 54a of phonetic letters of each recipient name 51 is displayed as a white letter in a FIG. 454b having a different shape for each Japanese syllable, thereby forming a letter icon 454 corresponding to each recipient 5 (not illustrated). In the third embodiment, the FIG. 454b included in the letter icon 454 has the same color, but can be colored in a different color for each Japanese syllable.

The FIG. 454b included in the letter icon 454 has a different form (for example, a different figure) for each Japanese syllable as the initial letter included in the letter icon 454 in the recipient selection screen 400. Here, the "different form" of the figure included in the letter icon means, for example, that the shape of the figure is the same but the color of the figure is different, or conversely, the color of the figure is the same but the shape of the figure is different, or the shape of the figure is different and the color of the figure is also different.

As another modified example of the letter icon 454, for example, combinations of the shape and the color of the FIG. 454b can be patterned and represented according to the vowel and the row of the Japanese syllabary of the initial letter 54a included in the letter icon 454. As an example, the shape of the FIG. 454b may be changed according to the vowel of the initial letter 54a. For example, the shape of the FIG. 454b is changed in such a manner that the FIG. 454b is a circle in a case where the initial letter 54a is "A", "KA", "SA", "TA", or the like whose vowel is "A", and the FIG. 454b is a square in a case where the initial letter 54a is "I", "KI", "SHI", or the like whose vowel is "I", and similarly, the FIG. 454b is a rhombus in a case where the vowel of the initial letter 54a is "U", the FIG. 454b is a triangle in a case where the vowel of the initial letter 54a is "E", and the FIG. 454b is a hexagon in a case where the vowel of the initial letter 54a is "O". The color of the FIG. 454b can be different for each row of the Japanese syllabary. For example, the color of the FIG. 454b can be red in a case where the row of the Japanese syllabary of the initial letter 54a is "A", the color of the FIG. 454b can be blue in a case where the row of the Japanese syllabary of the initial letter 54a is "SA", and the color of the FIG. 454b can be yellow in a case where the row of the Japanese syllabary of the initial letter 54a is "TA". A combination thereof is also applicable.

A control device 110 according to the third embodiment can obtain the following effects in addition to the effects of the configuration similar to that of the control device of the first embodiment.

The FIG. 454b included in the letter icon 454 has a different form for each Japanese syllable as the initial letter 54a included in the letter icon 454 in the recipient selection screen 400. Therefore, a difference in letter icon between Japanese syllables can be easily visually recognized, and switching positions of recipients sorted in the Japanese syllabary order can also be easily understood, which can further improve search performance. More specifically, for example, a FIG. 454b included in a letter icon 454 has a different color and/or shape for each Japanese syllable as an initial letter 54a included in the letter icon 454. Therefore, it is easy to recognize that, in the case of a recipient 5 for which a recipient name 51 written with kanji letters is registered, a group of recipients 5 grouped for each initial letter of phonetic letters of a recipient name 51 has been switched to a different group even when scrolling through an address list, due to a change in color or/and shape of a letter icon 454. As a result, it is possible to improve operability when searching for a desired recipient 5 by scrolling through an address list.

As a modified example of the recipient selection screen 310 according to the second embodiment, although not illustrated, in a case where a recipient name 51 is written with alphabet letters, a FIG. 354b included in a letter icon 354 may has a different shape for each alphabet letter. Therefore, a difference in letter icon between alphabet letters can be easily visually recognized, and switching positions of initial letters of recipients sorted in the alphabetical order can also be easily understood, which can further improve search performance. More specifically, for example, a FIG. 354b included in a letter icon 354 has a different color and/or shape for each alphabet letter as an initial letter 354a included in the letter icon 354. Therefore, it is easy to recognize that, in the case of a recipient 5 for which a recipient name 351 written with alphabet letters is registered, a group of recipients 5 grouped for each initial letter of a recipient name 351 has been switched to a different group even when scrolling through an address list, due to a change in color or/and shape of a letter icon 354, and it is thus possible to improve operability when searching for a desired recipient 5 by scrolling through an address list.

As described above, the embodiments of the information communication apparatus according to the technology of the disclosure has been described using a multi-function peripheral as an example, but technology of the disclosure is not limited thereto and can be implemented as various information communication apparatuses such as a smartphone and a mobile phone having a function of designating a communication destination by selecting a desired recipient from a plurality of recipients displayed in a list form in an operation screen.

The multi-function peripherals 100 according to the first to third embodiments are not limited to the above-described configurations, and the following changes are possible.

In the first to third embodiments, a letter icon can be changed. For example, a letter included in a letter icon in the first or third embodiment is a hiragana letter. However, the letter may be a katakana letter. In the first to third embodiments, a figure included in a letter icon can be changed. A figure included in a letter icon is preferably a relatively simple figure that is easy to visually recognize, such as a circle or a quadrangle, and the letter icon is preferably configured by combining the figure as a background of a letter.

The multi-function peripherals 100 according to the first to third embodiments have the copy function, the scanning function, the facsimile function, and the printing function, but the technology of the disclosure is not limited thereto. For example, an information apparatus having two or more functions including at least one of the copy function, the scanning function, or the printing function in addition to the facsimile function may be used. The information communication apparatus according to the disclosure may have other main functions (for example, telephone communication) other than the copy function, the scanning function, the facsimile function, and the printing function.

In the above-described embodiments, for example, as a hardware structure of a processing unit that executes various processings such as the UI control unit 141, the display control unit 142, the operation receiving unit 143, and the function control unit 144, various processors described below can be used. Examples of the various processors include, in addition to the CPU 111 which is a general-purpose processor that functions as various processing units by executing software (program), a programmable logic device (PLD) in which a circuit configuration can be changed after manufacturing, such as a field programmable gate array (FPGA) and a dedicated circuitry which is a processor having a dedicated circuit configuration designed for executing specific processing, such as an application specific integrated circuit (ASIC).

The various processings may be executed by one of these various processors, or may be executed by a combination of two or more processors of the same type or different types (for example, a plurality of FPGAs and a combination of a CPU and an FPGA). A plurality of processing units may be implemented by one processor. As an example in which a plurality of processing units are implemented by one processor, a processor that implements a function of the entire system including a plurality of processing units with one integrated circuit (IC) chip, such as a system on chip (SoC), may be used.

As described above, the various processing units are implemented using one or more of the various processors as a hardware structure.

More specifically, a circuitry obtained by combining circuit elements such as semiconductor elements can be used as the hardware structure of these various processors.

The technology of the disclosure is also applicable to a computer-readable storage medium (a universal serial bus (USB) memory, a digital versatile disc (DVD)-read only memory (ROM), or the like) that non-transiently stores a control program of the control device, in addition to the control program of the control device.

The disclosure is not limited to the above-described embodiments, and various modifications, changes, and improvements can be made without departing from the gist of the disclosure. For example, the above-described modified examples may be configured by combining a plurality of embodiments, if appropriate.

The disclosure of Japanese Patent Application No. 2019-236893 filed on Dec. 26, 2019 is incorporated herein by reference in its entirety. All documents, patent applications, and technical standards mentioned herein are incorporated herein by reference to the same extent as if each individual document, patent application, and technical standard were specifically and individually stated.

INDUSTRIAL APPLICABILITY

The technology of the disclosure relates to an information communication apparatus capable of designating a communication destination by selecting a desired recipient from a plurality of recipients displayed in a list form in an operation screen, and a control program executed in the information communication apparatus, and has industrial applicability.

What is claimed is:

1. An information communication apparatus that comprises a processor, a memory coupled to or integrated with the processor, a communication unit which transmits and receives data via a communication line and a reading unit which generates image data by optically reading an image of a document and is configured to designate a communication destination by selecting a desired recipient from a plurality of recipients displayed in a list form in an operation screen, each of the plurality of recipients being displayed in a rectangular region in the list, wherein the processor:

displays, in the rectangular regions of the recipients, recipient names, which are names of the recipients, and displays, in front of each of the recipient names, a letter icon including a combination of a first character of an initial letter of each recipient name and a figure, the letter icon being generated based on recipient names, sorts the recipients in a predetermined display order based on the first character of the initial letter included in the letter icon and displays the sorted recipients in the operation screen, receives a selection of a recipient from the sorted list, and transmits the data to the communication destination of the recipient selected on the operation screen from the communication unit, via the communication line, the data being image data generated by the reading unit, wherein in a case in which the recipient names written with kanji letters are displayed for the recipients, the first character of the initial letter of each recipient name is a first character of an initial letter of phonetic letters of the kanji letters constituting the recipient name, the letter icon includes a combination of the first character of the initial letter of the phonetic letters and the figure, and the recipients are sorted in a Japanese syllabary order based on the first character of the initial letter in the operation screen.

2. The information communication apparatus according to claim 1, wherein the figure included in the letter icon has a different form for each Japanese syllable as the first character of the initial letter.

3. A non-transitory recording medium storing a control program for an information communication apparatus that comprises a processor, a memory coupled to or integrated with the processor, a communication unit which transmits and receives data via a communication line and a reading unit which generates image data by optically reading an image of a document, the information communication apparatus causing a computer to function as the information communication apparatus, which is configured to designate a communication destination by selecting a desired recipient from a plurality of recipients displayed in a list form in an operation screen, each of the plurality of recipients being displayed in a rectangular region in the list, the control program causing the computer to execute:

displaying, in the rectangular regions of the recipients, recipient names, which are names of the recipients, and displaying, in front of each of the recipient names, a letter icon including a combination of a first character of an initial letter of each recipient name and a figure, the letter icon being generated based on recipient names;

sorting the recipients in a predetermined display order based on the first character of the initial letter included in the letter icon and displaying the sorted recipients in the operation screen, receiving a selection of a recipient from the sorted list, and transmitting the data to the communication destination of the recipient selected on the operation screen from the communication unit, via the communication line, the data being image data generated by the reading unit, wherein in a case in which the recipient names written with kanji letters are displayed for the recipients, the first character of the initial letter of each recipient name is a first character of an initial letter of phonetic letters of the kanji letters constituting the recipient name, the letter icon includes a combination of the first character of the initial letter of the phonetic letters and the figure, and the recipients are sorted in the Japanese syllabary order based on the first character of the initial letter in the operation screen.

4. The non-transitory recording medium according to claim 3, wherein the figure included in the letter icon has a different form for each Japanese syllable as the first character of the initial letter.

\* \* \* \* \*